(12) United States Patent
Derda (10) Patent No.: US 7,817,327 B2
(45) Date of Patent: Oct. 19, 2010

(54) VEHICLE GLAZING

(75) Inventor: Martin Derda, Bochum (DE)

(73) Assignee: Pilkington Automotive Deutschland GmbH, Witten (DE)

( * ) Notice: Subject to any disclaimer, the term of this patent is extended or adjusted under 35 U.S.C. 154(b) by 54 days.

(21) Appl. No.: 12/160,172

(22) PCT Filed: Jan. 3, 2007

(86) PCT No.: PCT/EP2007/050035

§ 371 (c)(1),
(2), (4) Date: Aug. 18, 2008

(87) PCT Pub. No.: WO2007/077239

PCT Pub. Date: Jul. 12, 2007

(65) Prior Publication Data

US 2009/0046355 A1    Feb. 19, 2009

(30) Foreign Application Priority Data

Jan. 6, 2006   (GB)   ................................ 0600215.8

(51) Int. Cl.
G02F 1/15    (2006.01)
G02F 1/153   (2006.01)
(52) U.S. Cl. ........................ 359/275; 359/265
(58) Field of Classification Search ......... 359/265–275, 359/359
See application file for complete search history.

(56) References Cited

U.S. PATENT DOCUMENTS

| 4,338,000 | A | 7/1982 | Kamimori et al. |
| 5,239,406 | A | 8/1993 | Lynam |
| 5,332,888 | A | 7/1994 | Tausch et al. |
| 5,587,828 | A | 12/1996 | Bernard, Jr. |
| 6,055,088 | A | 4/2000 | Fix et al. |
| 6,197,418 | B1 | 3/2001 | Cloots et al. |
| 6,323,429 | B1 | 11/2001 | Plaz |
| 6,355,125 | B1 | 3/2002 | Tahon et al. |
| 6,538,192 | B1 | 3/2003 | Coster et al. |
| 6,890,089 | B2 | 5/2005 | Haering et al. |

(Continued)

FOREIGN PATENT DOCUMENTS

DE    32 23 407 A1    12/1983

(Continued)

OTHER PUBLICATIONS

PTO/ISA/210 (International search Report) issued in PCT/EP007/050035.

(Continued)

*Primary Examiner*—Jack Dinh
(74) *Attorney, Agent, or Firm*—Buchanan, Ingersoll & Rooney PC (57) ABSTRACT

A vehicular glazing comprising two panes of glazing material spaced apart from one another, an electrically conductive coating provided on a surface of the glazing, and an electrical device mounted with respect to the electrically conductive coating, and having a solar control function. The solar control function may result from the presence of a solar control coating or at least one pane of glazing material being body-tinted. The glazing may be a laminate or a double glazing unit and it may also include a functional layer, such as a liquid crystal film.

16 Claims, 3 Drawing Sheets

U.S. PATENT DOCUMENTS

| | | |
|---|---|---|
| 2005/0002081 A1 | 1/2005 | Beteille et al. |
| 2005/0056638 A1 | 3/2005 | Maeuser |
| 2005/0088850 A1 | 4/2005 | Miller |
| 2005/0140917 A1 | 6/2005 | Miura et al. |
| 2005/0190331 A1 | 9/2005 | Yano |
| 2006/0275599 A1 | 12/2006 | Lefevre |
| 2007/0029300 A1 | 2/2007 | Platz |
| 2007/0154705 A1 | 7/2007 | Doeppner et al. |
| 2008/137355 A1 | 6/2008 | Offermann et al. |

FOREIGN PATENT DOCUMENTS

| | | |
|---|---|---|
| DE | 197 58 009 A1 | 7/1998 |
| DE | 199 59 084 A1 | 6/2001 |
| DE | 102 04 359 A1 | 10/2002 |
| DE | 101 64 063 A1 | 7/2003 |
| DE | 103 13 067 A1 | 10/2004 |
| DE | 103 22 561 A1 | 12/2004 |
| DE | 103 36 283 A1 | 3/2005 |
| DE | 103 47 163 A1 | 4/2005 |
| EP | 0 343 419 A2 | 11/1989 |
| EP | 0 900 971 A1 | 3/1999 |
| EP | 1 171 294 A1 | 1/2002 |
| EP | 1 437 215 A | 7/2004 |
| EP | 1 437 215 A1 | 7/2004 |
| EP | 1 535 885 A1 | 6/2005 |
| GB | 2 403 731 A | 1/2005 |
| JP | 58-136534 A | 8/1983 |
| JP | 64-61238 A | 3/1989 |
| JP | 6-018829 A | 1/1994 |
| JP | 6-027474 A | 2/1994 |
| JP | 7-306394 A | 11/1995 |
| JP | 8-211379 A | 8/1996 |
| JP | 2003-225971 A | 8/2003 |
| JP | 2004-122804 A | 4/2004 |
| JP | 2005-049417 A | 2/2005 |
| WO | WO 99/03111 A1 | 1/1999 |
| WO | WO 02/072408 A1 | 9/2002 |
| WO | WO 2004/009349 | 1/2004 |
| WO | WO 2004/016897 A1 | 2/2004 |
| WO | WO 2004/062908 A1 | 7/2004 |
| WO | WO 2004/084683 A1 | 10/2004 |
| WO | WO 2005/054915 A1 | 6/2005 |

OTHER PUBLICATIONS

UK Search Report issued in corresponding GB 0600215.8, Apr. 26, 2006, The Patent Office, UK.

VEHICLE GLAZING

The present invention relates to vehicle glazings, especially to vehicle glazings provided with an electrical device.

Vehicles, for example cars and buses, have a number of window openings in their bodywork into which glazings may be fitted; the glazings include windscreens, rear window glazings, side window glazings and roof glazings. In a typical car, the windscreen is a laminated glazing (i.e. having two plies of glazing material joined together by a ply of interlayer material extending between them) for safety reasons, and the remainder of the glazings are usually toughened glass (although laminated side window glazings are becoming increasingly popular in vehicles). In a typical bus, again the windscreen is a laminated glazing, the rear window glazing is usually toughened glass, and the side window and roof glazings may be double glazing units (i.e. having two plies of glazing material and a sealed airspace between them).

It is known to provide a vehicle glazing with an electrical device (i.e. a device that requires electrical energy to perform its function). WO 2004/009349 describes one example of such a glazing. It discloses a laminated vehicle glazing panel which includes a means of integrated lighting in the form of at least one light emitting diode within the laminate. The glazing panel may be a windscreen for installation into a vehicle and the one or more light emitting diodes may be used as indicia to convey information to the driver of the vehicle about, for example, the speed of the vehicle.

In addition to providing a vehicle glazing with an electrical device, it would be useful to be able to provide such a glazing with other functionality, but without compromising the function of the electrical device, and without significantly increasing the cost of producing such a glazing or the complexity of the production process.

Accordingly the present invention provides a vehicular glazing comprising: two panes of glazing material spaced apart from one another, an electrically conductive coating provided on a surface of the glazing, and an electrical device mounted with respect to the electrically conductive coating, wherein the glazing is provided with a solar control function.

A vehicular glazing comprising both an electrical device and a solar control function possesses multiple functionality that is able to provide additional benefit to the occupants of a vehicle into which such a glazing may be installed; in addition to benefiting from the function of the electrical device (for example the lighting effect of one or more light emitting diodes), the amount of solar heat (as infrared radiation) entering the vehicle may be reduced.

The two panes of glazing material may be spaced apart from one another by a further ply of material which extends between the two panes, or they may be spaced apart such that there is a gaseous layer (for example a sealed airspace) between them, as will be described in more detail later. The electrical device may be any device requiring electrical energy to function that has dimensions making it suitable for including in a vehicle glazing, for example a means of integrated lighting such as one or more light emitting diodes, a temperature sensor, a light sensor, a fingerprint sensor, a capacitive switch/sensor, an optical switch and the like. One or more such devices may be comprised in the glazing.

By describing that the electrically conductive coating is provided on a surface of the glazing, it is meant that the coating may be on a surface of one of the panes of glazing material, or it may be on a surface of some other ply of material that is comprised in the glazing but which is not explicitly disclosed.

The electrically conductive coating may include a single layer of a metal or metal oxide (the latter preferably being a transparent conductive oxide). Oxides of metals such as tin, zinc, indium, tungsten and molybdenum may be comprised in the single layer of metal oxide. The coating may further comprise a dopant, for example fluorine, chlorine, antimony, tin, aluminium, tantalum, niobium, indium or gallium, so that a coating such as fluorine-doped tin oxide or tin-doped indium oxide may result. An electrically conductive coating may be provided with an underlayer, for example comprising silicon oxide or silicon oxynitride, which serves as a barrier to control migration of alkali metal ions from the glass and/or as a colour suppressing layer to suppress iridescent reflection colours resulting from variations in thickness of the electrically conductive layer. A number of electrically conductive coatings are known in the art, any of which may be used in accordance with the invention.

Alternatively, the electrically conductive coating may comprise a multilayer coating stack which normally includes at least one metal layer or metal oxide layer and at least one dielectric layer. The multilayer stack structure may be repeated to further enhance the conductivity of the coating, and also any solar control function that the coating may perform. Amongst other similar metals, silver, gold, copper, nickel and chromium may be used as the metal layer in a multilayer stack; indium oxide, antimony oxide or the like may be used as the metal oxide layer. Coatings comprising one or two layers of silver interleaved between layers of a dielectric such as an oxide of silicon, aluminium, titanium vanadium, tin or zinc are typical multilayer stacks. Generally the one or more layers from which the coating is formed are of the order of tens of nanometers in thickness. Any of the coatings described above may perform the solar control function of the glazing referred to earlier.

Preferably, the glazing further comprises a functional layer that extends over a surface of at least one of the panes of glazing material. Further preferably, the functional layer extends between the two panes of glazing material. If the electrically conductive coating exhibits a solar control function (as described earlier), the functionality of the functional layer may be in addition to this solar control function, and may provide yet further benefit to an occupant of a vehicle into which such a glazing may be fitted, as will be described in more detail below. However, it may be that the electrically conductive coating does not exhibit any (or any appreciable) solar control functional, and so the functional layer alone may provide the glazing with its solar control function. If this is the case, the functional layer may comprise a ply of polymeric material that is provided on one of its surfaces with a solar control coating. The ply of polymeric material may be for example a ply of polyethylene terephthalate ("PET").

Typically, a solar control coating (as referred to above) may include either a) at least one silver-based layer or b) at least one tin-based layer. Accordingly the solar control coating may comprise one or more layers of zinc oxide, titanium dioxide and/or silver. Alternatively the solar control coating may comprise fluorine-doped tin oxide. The coating may also include one or more layers of silicon nitride, aluminium nitride and/or nichrome (NiCr).

The solar control coating may be an electrically conductive coating, so that the electrically conductive coating comprised in the glazing and the solar control coating described above may be one and the same thing. Thus the surface of the glazing on which the electrically conductive (solar control) coating is provided may be the ply of polymeric material (comprised in the functional layer). In this case, the electrical device may be mounted with respect to the solar control coating, through which the electrical power that it needs in order to function may be supplied.

Otherwise, the electrically conductive coating may be provided on a surface of one of the panes of glazing material (and the electrical device may thus be mounted with respect to that pane of glazing material). In this arrangement, the electrically conductive coating and the solar control coating comprised in the functional layer are separate entities.

The electrically conductive coating may include one or more uncoated areas, thereby enabling an electrical circuit to be formed with the electrical device when electrical power is supplied to the coating. An uncoated area may be formed by masking a selected area on the ply of material (for example pane of glazing material or ply of polymeric material) onto which the coating is to be deposited, so that when it is deposited, the selected area remains devoid of coating. An uncoated area may alternatively be formed by selective removal of the coating from the ply of material on which it has been deposited in a selected area, for example by laser ablation. The one or more uncoated areas may be in the form of tracks, preferably having a width (i.e. the spacing between adjacent coated areas) greater than 50 μm, but less than 100 μm to prevent the tracks from being visible. The width of the tracks is further preferably in the range 60 to 90 μm, and most preferably in the range 70 to 80 μm. The electrical device is preferably electrically attached to the electrically conductive coating itself, suitably using an electrical attachment means, such as a conductive adhesive, metallic solder or other such conductive material.

At least one of the panes of glazing material may be body-tinted glass, the composition of which includes one or more of the following colourants: iron oxide, cobalt oxide, selenium, chromium oxide, titanium oxide, manganese oxide, copper oxide, vanadium oxide, nickel oxide. The tint may be such that the glass absorbs an amount of infrared radiation; thus the solar control function of the glazing may be provided in this way in addition to, or as an alternative to, the electrically conductive coating having a solar control function and/or the presence of the functional layer provided with a solar control coating.

Both panes of glazing material may be panes of glass, and if only one pane is body-tinted, the other pane may be clear. It is also possible that both panes may be clear glass, or both panes may be body-tinted. One or both panes may be toughened glass. Rather than being a pane of glass, a pane of glazing material may be made from a plastics material, for example polycarbonate. The panes of glazing material may be flat or they may be curved. Each pane may be between 0.5 and 25 mm in thickness, preferably between 1 and 5 mm. The overall thickness of the glazing may therefore be between 1.5 and 100 mm, preferably between 2 and 50 mm, and further preferably between 2.5 and 20 mm.

The functional layer may comprise a ply of polymeric material which includes a visible light dispersant material for diffusing light transmitted through the glazing. Dispersion of light is especially useful if the electrical device of the glazing is in the form of one or more light emitting diodes. Light emitting diodes are discrete point sources of light. If more diffuse light is desired (for example, in courtesy or ambient lighting applications) a dispersant material may be included in the polymeric material to scatter light emitted by the one or more diodes within the polymeric material itself. This diffusive functionality may be in addition to, or an alternative to, the solar control function of the functional layer described earlier.

The functional layer may comprise a visible light attenuation material for attenuating light transmitted though the glazing. Again such functionality is especially useful if the electrical device of the glazing is in the form of one or more light emitting diodes, as light emitted by them may be reduced accordingly. This light attenuation functionality may be in addition to one or both of, or an alternative to both of, the solar control function and the diffusive function of the functional layer described earlier.

Preferably the visible light attenuation material includes a liquid crystal film. A liquid crystal film may diffuse visible light passing through it as well as attenuating it. The liquid crystal film may be electrically switchable between a clear state (resulting from a voltage being applied to the film) and an opaque state (having no voltage applied). The degree to which visible light passing through a liquid crystal film is attenuated and diffused may be controlled by regulation of the voltage applied to the film. Advantageously, the liquid crystal film may be divided into zones, and each zone may be independently switchable. Any known liquid crystal film material may be used, provided that it is suitable for inclusion in a vehicular glazing.

Combination of a functional interlayer which includes a liquid crystal film with an electrical device in the form of one or more light emitting diodes may be used to provide the following desirable scenarios for the occupants of a vehicle into which such a glazing may be installed:

a) when the vehicle is driven during the night time, and:

i) the liquid crystal film remains opaque and the one or more light emitting diodes are electrically powered (thus emitting light), the vehicle occupants may experience a diffuse ambient lighting within the vehicle;

ii) the liquid crystal film is electrically switched from opaque to clear and the one or more light emitting diodes are electrically powered, the vehicle occupants may experience "stellar" lighting, in that the light emitting diodes may resemble the stars of the night sky;

iii) the liquid crystal film remains opaque and the light emitting diodes are not powered, the vehicle occupants may experience an opaque lighting, the intensity of which is determined by the amount of moonlight falling upon the glazing;

b) when the vehicle is driven during the daytime, and:

i) the liquid crystal film remains opaque and the light emitting diodes are not powered, the vehicle occupants may experience an opaque lighting in the form of attenuated sunlight, the intensity of which is determined by the amount of sunlight falling upon the glazing.

It is of course possible that neither the light emitting diodes are powered nor the liquid crystal film electrically activated.

The visible light attenuation material may alternatively comprise a suspended particle device ("SPD"). An SPD may be electrically switchable between a darkened state (having no voltage applied to it) and a state of increased visible light transmittance (resulting from an AC voltage being applied to the device). Advantageously, the SPD may be divided into zones, and each zone may be independently switchable. Any known SPD may be used, provided that it is suitable for inclusion in a vehicular glazing.

The inner surface of the glazing is preferably provided with a low emissivity coating. By "the inner surface of the glazing" is meant that surface which would face into and contact the environment inside a vehicle into which the glazing may be installed (such surface could be touched by the occupants of the vehicle). The emissivity of a particular coating refers to the tendency of that coating to radiate energy. Thus a low emissivity coating is a poor thermal radiator (compared to a blackbody entity, which is a perfect radiator and is defined as having an emissivity of unity).

The low emissivity coating provided on the inner surface of the glazing will normally be such that, when applied to 3 mm clear float glass, the coated glass has an emissivity in the range from 0.05 to 0.45; the actual value being measured according to EN 12898 (a published standard of the European Association of Flat Glass Manufacturers). Coatings (when used on 3 mm clear float glass) resulting in an emissivity less than 0.3 are preferred. A hard coating (which when on a pane of glass is typically formed "on-line" by pyrolytically depositing the coating onto a surface of the glass during its formation, in known manner, for example by use of a chemical vapour deposition process) may generally have an emissivity greater than 0.15 (and preferably less than 0.2), whilst an off-line coating (which when on a pane of glass is typically deposited onto the surface of the pane subsequent to complete manufacture of the glass, and is normally a sputtered coating) may generally have an emissivity greater than 0.05 (and preferably less than 0.1). In both cases, the emissivity may be compared with the assumed normal emissivity of clear uncoated glass, which has a value of around 0.89.

The composition of the low emissivity coating may be the same as that described earlier for the electrically conductive coating: essentially either a single layer of an optionally doped metal or metal oxide, or a multilayer stack including at least one metal or metal oxide layer and at least one dielectric layer.

Preferably the electrical device is covered with a transparent encapsulant. The encapsulant may serve to protect the electrical device from physical damage and from the environment surrounding it, thereby increasing both the durability and the lifetime of the device. Advantageously, the transparent encapsulant may include a visible light dispersant material, for the reasons described earlier. The same effect may also be achieved if the electrical device in the form of one or more light emitting diodes is covered with a) a lens, for example one designed to increase the angular spread of the emitted light or b) another type of diffuser material, for example an epoxy resin, an acrylate or a methacrylate.

The vehicular glazing may further comprise reflection means for reflecting visible light emitted by the one or more light emitting diodes. Radiation is usually emitted from a light emitting diode in all directions; to make full use of the radiation that is emitted towards the surface with respect to which the one or more light emitting diodes are mounted, reflection means may be provided on that surface.

Preferably, the glazing has a visible light transmission (measured with CIE Illuminant A) of greater than 70% and further preferably greater than 75% when the panes of glazing material are substantially clear. If the glazing overall has a tint (because either at least one pane of glazing material is body-tinted or the interlayer material is tinted), it preferably has a visible light transmission (measured with CIE Illuminant A) of less than 40%, further preferably less than 30% and most preferably less than 25%, and a total energy transmission (Parry Moon; Air Mass 1.5) of less than 30%, further preferably less than 25% and most preferably less than 20%. The glazing may have these properties regardless of its laminar composition.

The vehicular glazing of the invention may be in the form of a laminate, having a ply of laminating interlayer material joining the panes of the glazing together. Thus the two panes of glazing material may be joined together by the ply of laminating interlayer material. If the glazing includes a functional layer, this may be provided as the ply of laminating interlayer material or it may additionally be laminated into the glazing. In the latter case, the functional layer may be interleaved between two plies of laminating interlayer material to form a composite interlayer. The laminating interlayer material may be any material known in the art that is suitable for forming a laminate. It may be polyvinylbutyral ("PVB"), polyvinyl chloride ("PVC"), polyurethane ("PU") or an ethyl vinyl acetate ("EVA"). It is typically provided in a thickness of between 0.38 and 1.1 mm, but most commonly 0.76 mm. The interlayer material may be clear, body-tinted or it may be infrared absorbing or reflecting (thereby providing, or at least contributing to, the solar control function of the glazing).

Alternatively, the glazing of the invention may be in the form of a double glazing unit, having a sealed airspace between the two panes of glazing material. The two panes may be spaced apart from one another by spacer elements located along at least two opposing edges of the panes. If the glazing includes a functional layer, this may be located on a surface of one of the panes of glazing material that faces into the airspace.

A double glazing unit is the most basic form of a multiple glazing unit; the glazing of the invention may comprise three or more panes of glazing material, each spaced apart from one another by a sealed airspace. A multiple pane glazing unit may itself form part of a laminated glazing, that is to say the unit may effectively form one ply of the laminate, which is to be joined to a pane of glazing material using a laminating interlayer material. In such a laminate, the glazing unit preferably forms the outer ply (the ply in contact with the environment exterior to the vehicle).

A vehicular glazing according to the invention may be fitted into any window in the bodywork of a vehicle. It may be especially used as a roof window.

For a better understanding the present invention will now be more particularly described by way of non-limiting example with reference to, and as shown in, the accompanying schematic drawings wherein.

Figure 1:
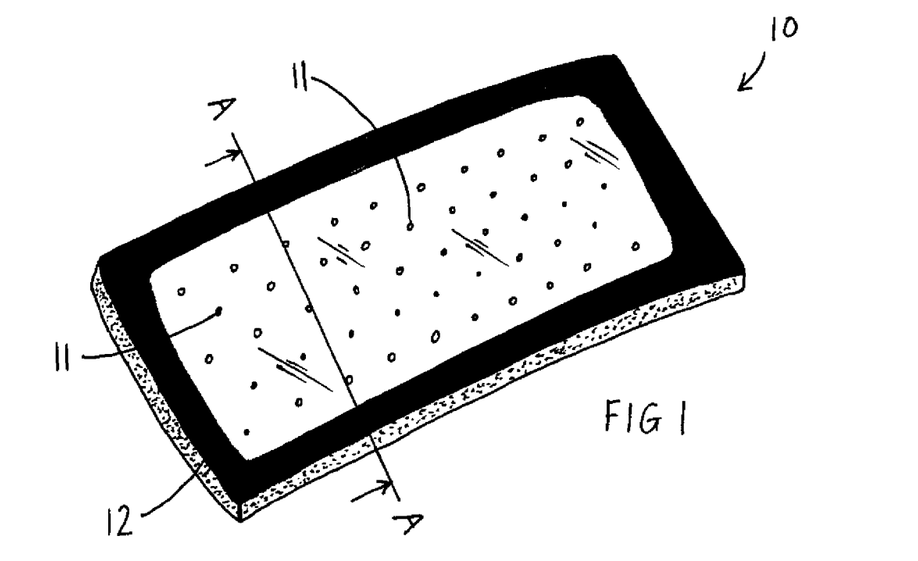
FIG. 1 is a perspective view of a vehicular glazing according to the invention.

FIG. 1 shows a vehicular glazing, in the form of a roof window 10, comprising an electrical device in the form of a plurality of light emitting diodes 11 mounted with respect to one of the surfaces of the glazing. The light emitting diodes are located to as to form a regular pattern, although any pattern, regular or irregular, and any number of diodes could be used. Around the periphery of roof window 10 there is an obscuration band 12, which is there to disguise and protect the sealant (not shown) that is used to fix the window into a vehicle (not shown). Obscuration band 12 is made from opaque ink that has been screen printed onto the glazing and subsequently fired. However, it may be composed of and applied using any other known means. It is possible (although not shown in FIG. 1) that a number of light emitting diodes 11 (or all of them) could be located within obscuration band 12, which would be suitably printed (for example by masking discrete areas during a screen printing process) so as to allow light from each of the diodes 11 to pass through it. Such an arrangement would mean that the light emitting diodes could be mounted on a flexible substrate (not shown) which would itself be hidden by obscuration band 12.

Figure 2:
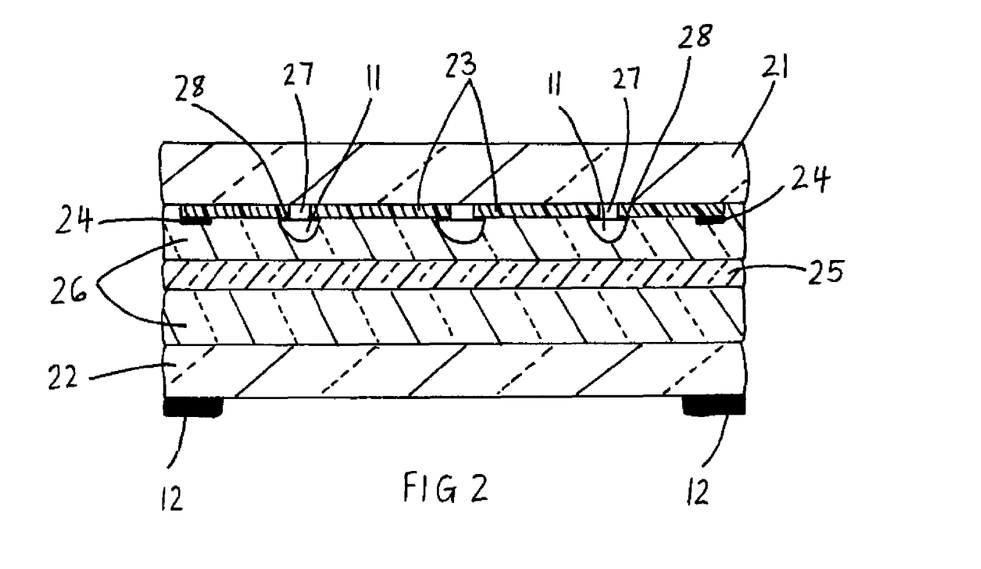
FIG. 2 is a cross section viewed along line A-A of FIG. 1.

FIG. 2 provides more detail about the construction of roof window 10 in that it is a laminate which comprises outer pane of glazing material, in the form of a pane of soda lime silica glass 21, inner pane of glazing material, also in the form of a pane of soda lime silica glass 22, electrically conductive coating 23, busbars 24, functional layer 25, and two plies of laminating interlayer material, in the form of PVB 26, which join the plies of the laminate together.

By "outer pane" is meant the pane which contacts the environment external to a vehicle into which roof window 10 may be fitted; similarly, by "inner pane" is meant the pane which contacts the interior environment of said vehicle. A pane of soda lime silica glass may be clear glass and have a composition in the range (by weight): $SiO_2$ 68-75%; $Al_2O_3$ 0-5%; $Na_2O$ 10-18%; $K_2O$ 0-5%; MgO 0-10%; CaO 5-15%; $SO_3$ 0-2%. The glass may also contain other additives, for example, refining aids, which would normally be present in an amount of up to 2%.

One or more of the panes may be tinted glass (thereby contributing to the solar control function of roof window 10) having, for example, one of the following compositions:

Composition 1

Base glass (by weight): 72.1% $SiO_2$, 1.1% $Al_2O_3$, 13.5% $Na_2O$, 0.6% $K_2O$, 8.5% CaO, 3.9% MgO and 0.2% $SO_3$, and a colourant portion (by weight): 1.45% total iron (calculated as $Fe_2O_3$), 0.30% ferrous oxide (calculated as FeO), 230 ppm $Co_3O_4$, 210 ppm NiO and 19 ppm Se. Such a glass is currently available as GALAXSEE™ from Pilkington plc in the United Kingdom;

Composition 2

Same base glass as composition 1 described above, and a colourant portion (by weight): 1.57% total iron (calculated as $Fe_2O_3$), 0.31% ferrous oxide (calculated as FeO), 115 ppm $Co_3O_4$, 0 ppm NiO and 5 ppm Se. Such a glass is currently available as SUNDYM™, again from Pilkington plc in the United Kingdom.

Electrically conductive coating 23 is provided on the inner surface of outer pane 21, i.e. on surface 2 of the glazing, and is in the form of a solar control, silver-based coating containing one or more of the following layers (in addition to at least one silver layer): $TiO_2$, $In_2O_3$, $Si_3N_4$, NiCr, AlN, ZnO, $SnO_2$, $Zn_xSnO_y$. Alternatively electrically conductive coating 23 could instead be provided on the inner surface of inner pane 22, i.e. on surface 3 of the glazing.

Light emitting diodes 11 are attached to electrically conductive coating 23 and face into the laminate in the direction of the interior of a vehicle into which roof window 10 may be installed (if coating 23 is on surface 3 instead of surface 2, diodes 11 would face into the laminate in the direction of the vehicle exterior). Electrically conductive coating 23 is provided with busbars 24 for supplying electrical energy from an external power source (not shown) to coating 23. Busbars 24 are hidden from view by the occupants of the vehicle into which roof window 10 may be installed by obscuration band 12, which is provided on the outer surface of inner pane 22, i.e. on surface 4 of the glazing.

Surface 4 of roof window 10 could additionally be provided with a low emissivity coating (not shown) to further increase the solar control function of the glazing.

Electrically conductive coating 23 is also provided with a number of uncoated areas 27. A diode 11 is attached to coating 23 on either side of an uncoated area 27 using attachments means 28, for example a conductive adhesive. A number of conductive adhesives are currently available from Cotronics Corp., 3379 Shore Parkway, Brooklyn, New York 11235, USA (www.cotronics.com). When an electrical current is supplied to coating 23, the presence of the one or more uncoated areas 27 means that an electrical circuit is created with each of the diodes 1, enabling them to perform their light emitting function.

The example glazing shown in FIGS. 1 and 2 has functional layer 25 in the form of a liquid crystal layer, interleaved between the two plies of PVB 26. Alternatively functional layer 25 may be in the form of a ply of polymeric material, for example PVB or PET, having a solar control coating on one of its surfaces. The solar control coating may be comprised of multiple alternate layers of silver and indium oxide. Plies of coated PET suitable for inclusion in a vehicle glazing are currently available from Southwall Technologies Inc., 3975 East Bayshore Road, Palo Alto, Calif. 94303, US (www.southwall.com). Further alternatively functional layer 25 may be in the form of a ply of polymeric material, for example PVB or PET, which includes a visible light dispersant material. It is also possible that functional layer 25 may incorporate two or more of these three alternatives.

Figure 3:
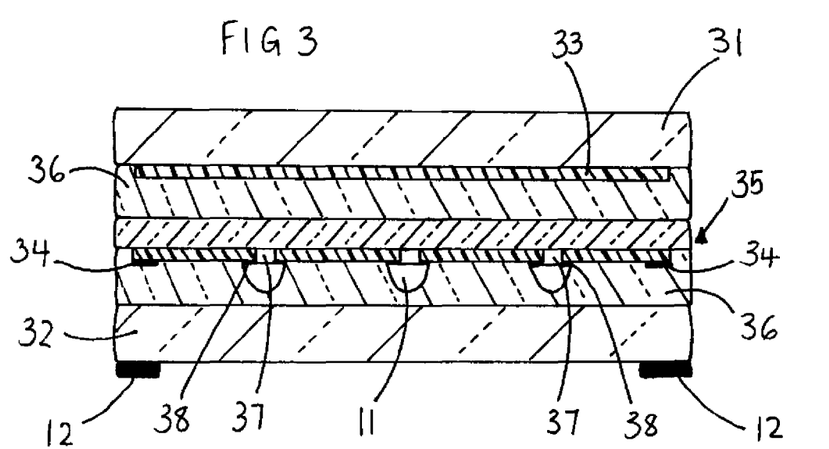
FIG. 3 is a cross section viewed along line A-A of an alternative construction of the glazing in FIG. 1.

The glazing shown in FIG. 3 is similar to that shown in FIG. 2 in that it is a laminate comprising outer pane of glazing material, in the form of a pane of clear soda lime silica glass 31, inner pane of glazing material, also in the form of a pane of clear soda lime silica glass 32, electrically conductive coating 33, busbars 34, functional layer 35, and two plies of laminating interlayer material, in the form of PVB 36, which join the plies of the laminate together.

The description of the glazing shown in FIG. 2 applies to that shown in FIG. 3 except:

functional layer 35 is in the form of a ply of polymeric material having an electrically conductive solar control coating on its lower surface (the surface closest to inner pane of glass 32). The coating may again comprise multiple alternate layers of silver and indium oxide. Functional layer 35 may additionally include a liquid crystal layer and/or a light dispersant material in the ply of polymeric material;

light emitting diodes 11 are attached to the solar control coating of functional layer 35 using attachment means 38, and face into the laminate in the direction of the interior of a vehicle into which roof window 10 may be installed (the location of the solar control coating on functional layer 35 may alternatively be such that the diodes 11 face into the laminate in the direction of the vehicle exterior);

the solar control coating is provided with busbars 34, which are hidden from view by obscuration band 12, and a number of uncoated areas 37.

Figure 4:
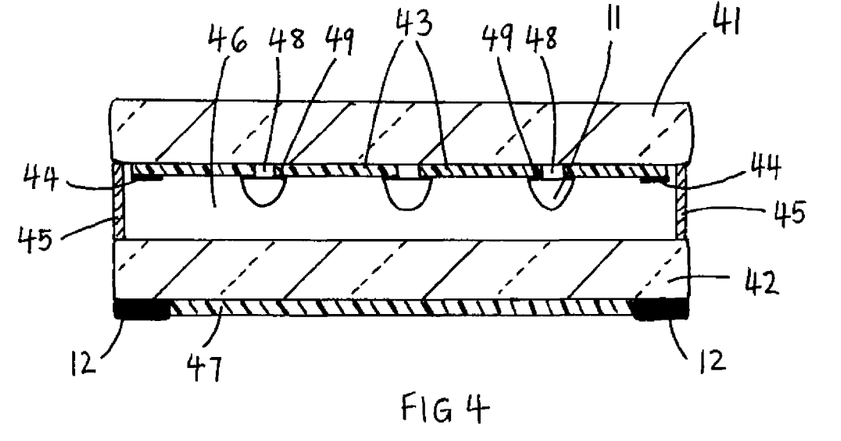
FIG. 4 is a cross section viewed along line A-A of a second alternative construction of the glazing in FIG. 1.

The construction of roof window 10 shown in FIG. 4 is that of a double glazing unit which comprises outer pane of glazing material, in the form of a pane of soda lime silica glass 41, inner pane of glazing material, also in the form of a pane of soda lime silica glass 42, electrically conductive coating 43, busbars 44, spacers 45 which maintain the panes of glass 41,42 spaced apart from one another, and low emissivity coating 47. Spacers 45 are used to seal the airspace 46 between panes 41,42. Instead of filling airspace 46 with air, it may be filled with any other gas, preferably an inert gas that provides the glazing with good thermal insulation properties.

The composition of panes of glass 41,42 is the same as described above for FIG. 2. Electrically conductive coating 43 is provided on the inner surface of outer pane 41, i.e. on surface 2 of the glazing, and is in the form of a solar control silver-based coating. Alternatively electrically conductive coating 43 could instead be provided on the inner surface of inner pane 42, i.e. on surface 3 of the glazing.

Light emitting diodes 11 are attached to electrically conductive coating 43 and face into airspace 46 in the direction of the interior of a vehicle into which roof window 10 may be installed (if coating 43 is on surface 3 instead of surface 2, diodes 11 would face into airspace 46 in the direction of the vehicle exterior). Electrically conductive coating 43 is provided with busbars 44 for supplying electrical energy from an external power source (not shown) to coating 43. Busbars 44 are hidden from view by the occupants of the vehicle into which roof window 10 may be installed by obscuration band 12, which is provided on the outer surface of inner pane 42, i.e. on surface 4 of the glazing. Low emissivity coating 47 is also provided on surface 4 of roof window 10, to further increase the solar control function of the glazing.

Electrically conductive coating 43 is also provided with a number of uncoated areas 48. A diode 11 is attached to coating 43 on either side of an uncoated area 48 using attachments means 49, for example a conductive adhesive available from Cotronics Corp., as above. When an electrical current is supplied to coating 43, the presence of the one or more uncoated areas 48 means that an electrical circuit is created with each of the diodes 11, enabling them to perform their light emitting function.

Figure 5:
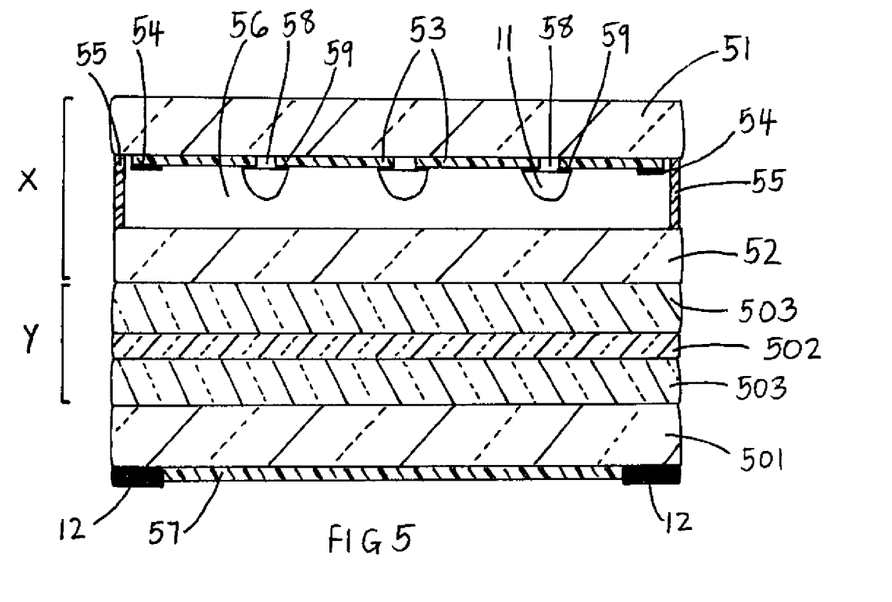
FIG. 5 is a cross section viewed along line A-A of a third alternative construction of the glazing in FIG. 1.

The glazing shown in FIG. 5 is similar to that shown in FIG. 4 in that it includes a double glazing unit (labelled "X") comprising outer pane of glazing material, in the form of a pane of soda lime silica glass 51, middle pane of glazing material, also in the form of a pane of soda lime silica glass 52, electrically conductive coating 53, busbars 54 and spacers 55 which maintain the panes of glass 51,52 spaced apart from one another.

Double glazing unit X is part of a laminate—it forms one "ply" of the laminate that is joined to inner pane of glazing material, also in the form of a pane of soda lime silica glass 501, by a composite interlayer (labelled "Y"). Composite interlayer Y itself comprises functional layer 502 interleaved between two plies of laminating interlayer material, in the form of PVB 503, which join the plies of the laminate together.

The composition of panes of glass 51, 52, 501, the location and composition of electrically conductive coating 53 and the manner of attachment of light emitting diodes 11 to electrically conductive coating 53 about uncoated areas 58 using attachment means 59 are the same as described above in relation to FIG. 4. Busbars 54 are hidden from view by obscuration band 12, which is provided on the outer surface of inner pane 501, i.e. on surface 6 of the glazing. Low emissivity coating 57 is also provided on surface 6 of roof window 10, to further increase the solar control function of the glazing. Functional layer 502 is the same as described in relation to FIG. 2 above. It is possible that instead of composite interlayer Y, a single ply of PVB 503 is used, so that the glazing does not include a functional layer. In this case, the solar control function of the glazing is provided by one or more of electrically conductive coating 53, panes of glass 51,52,501 being tinted and PVB ply 503 being infrared absorbing or reflecting.

Figure 6:
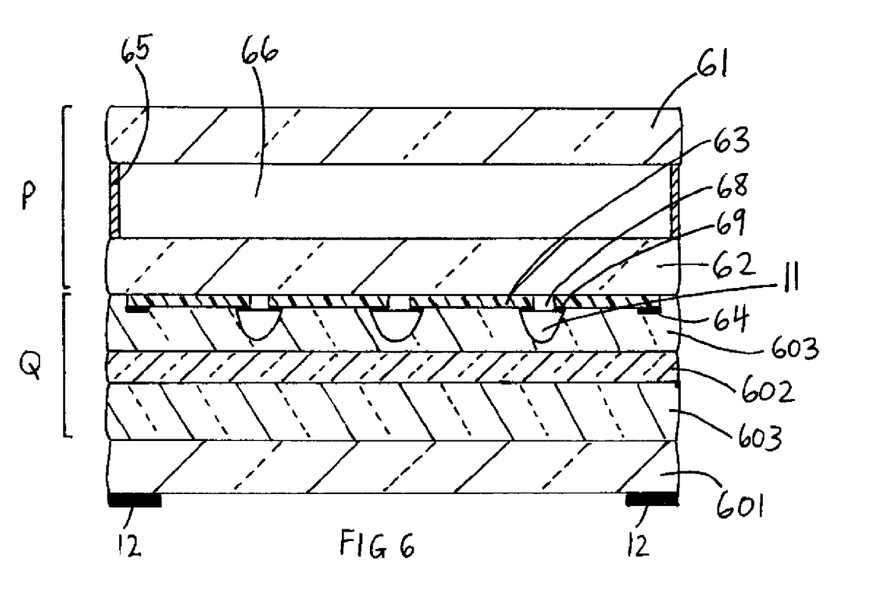
FIG. 6 is a cross section viewed along line A-A of a fourth alternative construction of the glazing in FIG. 1.

FIG. 6 depicts a glazing that is similar to the one shown in FIG. 5 in that it includes a double glazing unit (labelled "P") comprising outer pane of glazing material, in the form of a pane of soda lime silica glass 61, middle pane of glazing material, also in the form of a pane of soda lime silica glass 62, electrically conductive coating 63, busbars 64 and spacers 65 which maintain the panes of glass 61,62 spaced apart from one another.

Double glazing unit P is part of a laminate—it forms one "ply" of the laminate that is joined to inner pane of glazing material, also in the form of a pane of soda lime silica glass 601, by a composite interlayer (labelled "Q"). Composite interlayer Q itself comprises functional layer 602 interleaved between two plies of laminating interlayer material, in the form of PVB 603, which join the plies of the laminate together.

The composition of panes of glass 61, 62, 601, the composition of electrically conductive coating 63 and the manner of attachment of light emitting diodes 11 to electrically conductive coating 63 about uncoated areas 68 using attachment means 69 are the same as described above in relation to FIG. 5. The location of electrically conductive coating 63 is however different from in FIG. 5—it is located on the lower surface of middle pane of glass 62 such that light emitting diodes 11 face into, and are laminated by, composite interlayer Q. Busbars 64 are hidden from view by obscuration band 12, which is provided on the outer surface of inner pane 601, i.e. on surface 6 of the glazing.

Functional layer 602 is the same as described in relation to FIG. 2 above. Again it is possible that instead of composite interlayer Q, a single ply of PVB 603 is used, so that the glazing does not include a functional layer. In this case, the solar control function of the glazing is provided by one or more of electrically conductive coating 63, panes of glass 61,62,601 being tinted and PVB ply 603 being infrared absorbing or reflecting.

The invention claimed is:

1. A vehicular glazing comprising:
   two panes of glazing material spaced apart from one another;
   an electrically conductive coating provided on a surface of the glazing, and
   an electrical device mounted with respect to the electrically conductive coating,
   wherein the glazing is provided with a solar control function, and it further comprises a functional layer which extends between the two panes of glazing material, said functional layer comprising a ply of polymeric material which includes a visible light dispersant material.

2. A vehicular glazing as claimed in claim 1, wherein a solar control coating is provided on one of the surfaces of the functional layer.

3. A vehicular glazing as claimed in claim 2, wherein the solar control coating includes either: a) at least one silver-based layer; or b) at least one tin-based layer.

4. A vehicular glazing as claimed in claim 2, wherein the solar control coating is the electrically conductive coating with respect to which the electrical device is mounted.

5. A vehicular glazing as claimed in claim 1, wherein the electrically conductive coating is provided on a surface of one of the panes of glazing material.

6. A vehicular glazing as claimed in claim 1, wherein the electrically conductive coating includes one or more uncoated areas.

7. A vehicular glazing as claimed in claim 6, wherein the electrical device is electrically attached to the electrically conductive coating by an electrically conductive attachment means.

8. A vehicular glazing as claimed in claim 1, wherein at least one of the panes of glazing material is body-tinted glass having a composition comprising one or more colourants as follows: iron oxide, cobalt oxide, selenium, chromium oxide, titanium oxide, manganese oxide, copper oxide, vanadium oxide, nickel oxide.

9. A vehicular glazing as claimed in claim 1, wherein the functional layer further comprises a visible light attenuation material.

10. A vehicular glazing as claimed in claim 9, wherein the visible light attenuation material includes a liquid crystal or comprises a suspended particle device.

11. A vehicular glazing as claimed in claim 1, wherein the glazing possesses an inner surface adapted to face an interior of a vehicle, and wherein the inner surface of the glazing is provided with a low emissivity coating.

12. A vehicular glazing as claimed in claim 1, wherein the glazing possesses a visible light transmission of less than 40% according to CIE Illuminant A and a total energy transmission of less than 30% according to Parry Moon; Air Mass 1.5.

13. A vehicular glazing as claimed in claim 1, wherein the glazing is a laminate having a ply of laminating interlayer material joining the panes of the glazing together.

14. A vehicular glazing as claimed in claim 13, wherein the ply of laminating interlayer material either absorbs or reflects infrared radiation.

15. A vehicular glazing as claimed in claim 1, wherein the glazing is a double glazing unit having a sealed airspace between the two panes of glazing material.

16. Use of a vehicular glazing as claimed in claim 1, as a roof window.

* * * * *